UNITED STATES PATENT OFFICE.

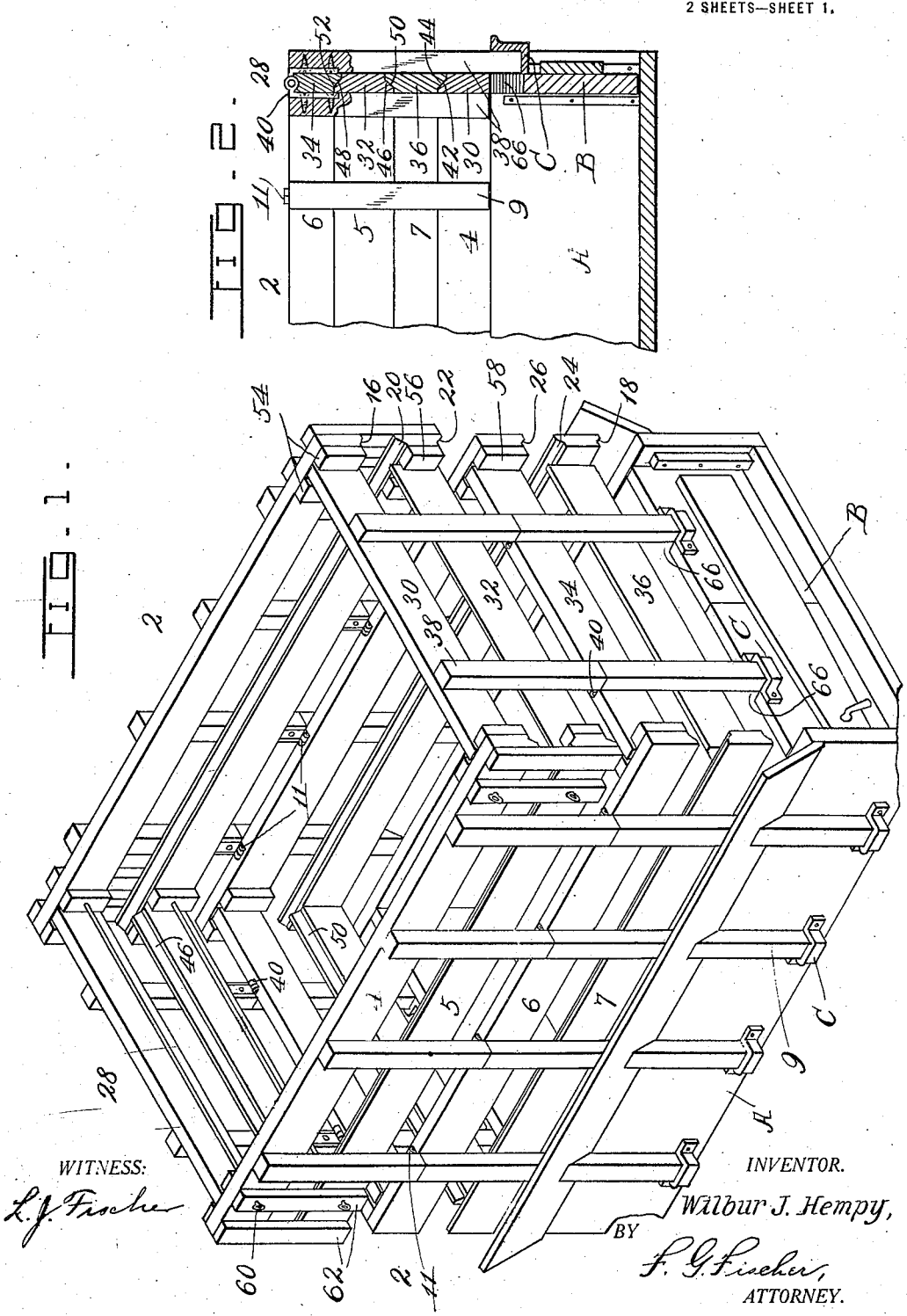

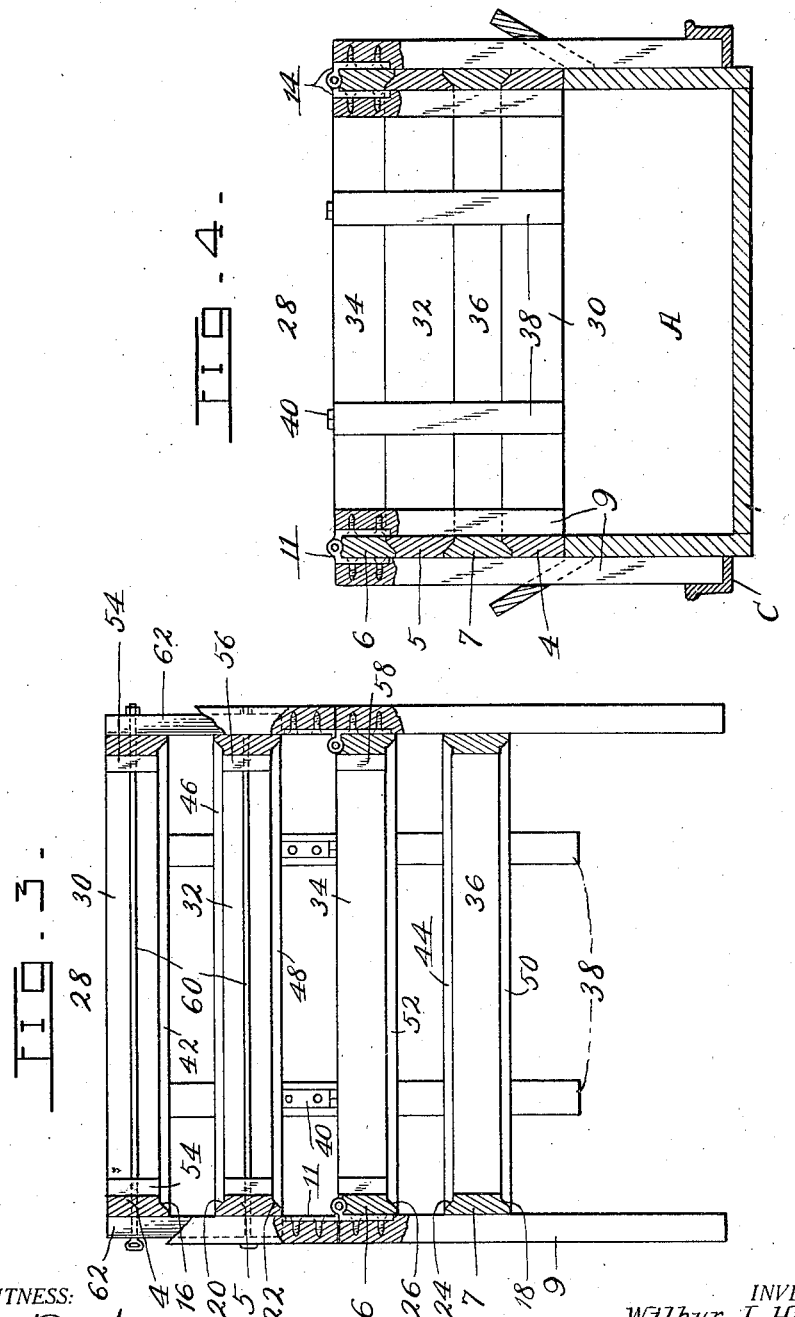

WILBUR J. HEMPY, OF OTTAWA, KANSAS.

CONVERTIBLE VEHICLE-RACK.

1,351,475.   Specification of Letters Patent.   Patented Aug. 31, 1920.

Application filed January 9, 1919. Serial No. 270,282.

*To all whom it may concern:*

Be it known that I, WILBUR J. HEMPY, a citizen of the United States, residing at Ottawa, in the county of Franklin and State of Kansas, have invented certain new and useful Improvements in Convertible Vehicle-Racks, of which the following is a specification.

My invention relates to improvements in convertible racks, for use on vehicles, such as automobile trucks, farm wagons, etc., and one object is to provide a rack which may be converted into an open frame work for the transportation of live stock and other commodities, and converted into a tight box in conjunction with the vehicle body for the transportation of grain and other products requiring a tight inclosure to prevent leakage.

Another object is to provide a rack which may be readily placed in position upon a vehicle body or removed therefrom.

Other objects will hereinafter appear and in order that the invention may be fully understood, reference will now be made to the accompanying drawings, in which:

Figure 1 is a perspective view of the rack mounted on a vehicle body and adjusted to open position for the transportation of live stock, etc.

Fig. 2 is a broken vertical longitudinal section of the rear portion of the vehicle body and of the rack, which latter is adjusted to closed position for the transportation of grain, etc.

Fig. 3 is a vertical cross section of the rack adjusted for live stock.

Fig. 4 is a vertical cross section of the rack in closed position and mounted upon the vehicle body.

Referring now in detail to the various parts, A designates a vehicle body having the usual tail-gate B provided with sockets C, which are also placed at the front and sides of the body A.

In constructing the rack, I employ duplicate sides 2, each consisting of longitudinal slats 4, 5, 6 and 7, spaced apart and secured to upright stakes 9, the lower ends of which are adapted to fit into the socket C at the sides of the vehicle body A.

The stakes 9 are in two sections which abut at a point approximately level with the upper surface of the slats 6 and operably-connected by hinges 11, so that the upper sections may be adjusted to the raised position disclosed by Figs. 1 and 3, or folded as disclosed by Figs. 2 and 4. The hinges 11 have offsets 14 adapted to extend over the upper edges of the slats 6, so that the upper sections of the stakes 9 may fold snugly against the inner sides of the slats 6 and 7, as disclosed more clearly on Fig. 4.

The bottom edges of the slats 4 have beveled portions 16 extending their entire length to fit snugly against the correspondingly beveled edges 18 of the slats 7 when the upper sections of the stakes 9 are folded to the position disclosed by Fig. 4. The upper and lower edges of the slats 5 have beveled portions 20 and 22 to fit against the correspondingly beveled portions 24 and 26 of the slats 7 and 6, respectively.

The end-gates 28 of the rack are duplicates and of similar construction to the sides 2. Each end-gate 28 consists of slats 30, 32, 34 and 36, spaced apart and secured to stakes 38, the lower ends of which are adapted to fit into the sockets C at the ends of the vehicle bed A.

The stakes 38 are in two sections which abut at a point approximately level with the upper edges of the slats 34 and operably connected by hinges 40 similar to the hinges 11, so that the upper sections may be swung upwardly or folded snugly against the inner surfaces of the slats 34 and 36. The slats 30 are provided at their lower edges with beveled portions 42 to fit against the correspondingly beveled under portions 44 of the slats 36, while the slats 32 have upper and lower beveled edges 46 and 48 to fit against the correspondingly beveled upper and lower edges 50 and 52 of the slats 36 and 34, respectively.

When the rack is adjusted to open position as disclosed by Figs. 1 and 3, the upper sections of the stakes 38 are held in upright position by the slats 30 and 32, which fit between pairs of short cleats 54 and 56 secured to the inner surfaces of the slats 4 and 5, respectively. The slats 6 are provided at their inner surfaces with pairs of short cleats 58 spaced apart to receive the ends of the slats 34 and thus coöperate with the cleats 54 and 56 and the stakes 38 and their respective sockets C in holding the end-gates 28 in position between the sides 2.

The sides 2 of the rack are prevented from spreading apart by tie-rods 60 extending transversely through the slats 4 and 5 and one of each pair of long cleats 62 uniting the ends of said slats 4 and 5. The tie-rods 60 are removable to permit the slats 4 and 5 to fold under the slats 7 and 6, respectively.

Each pair of cleats 62 is spaced apart to receive the adjacent ends of the end-gate slats 34 and 36 when the rack is closed for carrying grain, etc.

The small cleats 54 and 56 are short enough to pass through the spaces under the slats 7 and 6, respectively, when the rack is closed.

The tail-gate B has notches 66 adjacent the open sides of its sockets C, so that it can be removed without disturbing the adjacent end-gate 28. This is a very convenient feature as it provides for an opening through which grain can be removed from the body A, without first removing said adjacent end-gate 28, which operation would be difficult owing to the pressure of the grain against the end-gate.

From the foregoing description, it will be readily understood that I have provided a simple and substantial rack which is well adapted for the purposes intended, and by beveling the edges of the slats as described lap joints are provided which prevent leakage of the smallest grains, and while I have shown and described the preferred form of my invention, I reserve the right to make such changes in the construction, combination and arrangement of parts as properly fall within the spirit and scope of the claim.

Having thus described my invention, what I claim and desire to secure by Letters Patent, is:

A convertible rack consisting of two oppositely-disposed sides the upper portions of which are hinged to fold downwardly, and an end-gate disposed at one end of said oppositely-disposed sides and consisting of stakes having upper and lower sections, hinges connecting said sections so that the upper sections may fold downwardly, slats secured to said stakes and spaced apart to form an open end-gate when the stakes are extended and a grain tight end-gate when said stakes are folded, in combination with a vehicle body having a tail-gate with notches in its upper portion registering with the stakes so that it can be opened and closed without disturbing the end-gate, and sockets on said tail-gate to receive the lower ends of the stakes, said sockets having open sides registering with the notches in the tail-gate.

In testimony whereof I affix my signature, in the presence of two witnesses.

WILBUR J. HEMPY.

Witnesses:
F. G. FISCHER,
L. J. FISCHER.